US010351143B2

United States Patent
Mueller et al.

(10) Patent No.: US 10,351,143 B2
(45) Date of Patent: Jul. 16, 2019

(54) VEHICLE-BASED MOBILE DEVICE USAGE MONITORING WITH A CELL PHONE USAGE SENSOR

(71) Applicant: Ford Global Technologies, LLC, Dearborn, MI (US)

(72) Inventors: Paul Anthon Mueller, St. Clair Shores, MI (US); John Dolinsky, Jr., Ann Arbor, MI (US); Thomas Eric Svenson, Novi, MI (US); Gregory William Farrey, Ypsilanti, MI (US); Boris Gorovets, West Bloomfield, MI (US); Timothy Smith, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/264,466

(22) Filed: Sep. 13, 2016

(65) Prior Publication Data

US 2018/0072321 A1    Mar. 15, 2018

(51) Int. Cl.
| | |
|---|---|
| *B60W 40/08* | (2012.01) |
| *B60Q 9/00* | (2006.01) |
| *H04B 17/00* | (2015.01) |
| *B60W 50/16* | (2012.01) |
| *B60K 28/06* | (2006.01) |

(Continued)

(52) U.S. Cl.
CPC ........... *B60W 40/08* (2013.01); *B60K 28/066* (2013.01); *B60Q 9/00* (2013.01); *B60W 50/16* (2013.01); *H04B 17/0082* (2013.01); *B60W 2050/143* (2013.01); *B60W 2420/00* (2013.01); *B60W 2540/00* (2013.01); *B60W 2710/0677* (2013.01);

(Continued)

(58) Field of Classification Search
CPC ............ B60W 40/08; B60W 2710/30; B60W 2540/00; B60W 2420/00; B60W 2710/0677; H04B 17/0082; B60Q 9/00
USPC ..................................................... 701/36, 93
See application file for complete search history.

(56) References Cited

U.S. PATENT DOCUMENTS

| | | | |
|---|---|---|---|
| 5,812,067 A * | 9/1998 | Bergholz ................ | B60R 25/04 180/257 |
| 6,262,657 B1 * | 7/2001 | Okuda ................. | B60K 28/066 340/438 |

(Continued)

FOREIGN PATENT DOCUMENTS

WO    WO 2004019646 A1    3/2004

OTHER PUBLICATIONS

Search Report dated Feb. 21, 2018 for GB Patent Application No. 1714672.1 (4 pages).

*Primary Examiner* — Tyler J Lee
(74) *Attorney, Agent, or Firm* — Frank Lollo; Neal, Gerber & Eisenberg LLP; James P. Muraff

(57) ABSTRACT

Methods and apparatus are disclosed for vehicle mobile device usage monitoring with a cell phone usage sensor. An example disclosed vehicle includes a cellphone usage sensor and a communication enforcer. The example cellphone usage sensor monitors a detection area around a driver's seat. The example communication enforcer changes an operation of the vehicle when the cellphone usage sensor detects usage of a mobile device within the detection area, a communication management feature is enabled, and the mobile device is not communicatively coupled to a wireless module of the vehicle.

23 Claims, 3 Drawing Sheets

(51) Int. Cl.
  *H04B 17/345* (2015.01)
  *B60W 50/14* (2012.01)
(52) U.S. Cl.
  CPC ..... *B60W 2710/30* (2013.01); *B60W 2720/10* (2013.01); *H04B 17/345* (2015.01)

(56) References Cited

U.S. PATENT DOCUMENTS

| | | | | |
|---|---|---|---|---|
| 6,631,271 | B1* | 10/2003 | Logan | G06F 3/002 340/539.13 |
| 7,646,312 | B2* | 1/2010 | Rosen | H04M 3/2281 340/933 |
| 8,731,530 | B1* | 5/2014 | Breed | H04M 1/72577 455/414.1 |
| 9,002,402 | B2 | 4/2015 | Mueller et al. | |
| 9,042,872 | B1* | 5/2015 | Breed | H04M 1/72577 455/414.1 |
| 9,110,774 | B1* | 8/2015 | Bonn | G06F 17/00 |
| 9,270,809 | B2 | 2/2016 | Allen et al. | |
| 9,473,919 | B2* | 10/2016 | Doorandish | H04W 4/90 |
| 9,663,112 | B2* | 5/2017 | Abou-Nasr | B60W 40/08 |
| 9,914,358 | B2* | 3/2018 | Brewer | B60K 28/06 |
| 2007/0241861 | A1* | 10/2007 | Venkatanna | G06F 21/32 340/5.52 |
| 2008/0085689 | A1* | 4/2008 | Zellner | H04M 1/6075 455/187.1 |
| 2009/0082951 | A1* | 3/2009 | Graessley | G01C 21/3602 701/532 |
| 2009/0085728 | A1* | 4/2009 | Catten | H04K 3/415 340/425.5 |
| 2009/0215387 | A1 | 8/2009 | Brennan et al. | |
| 2010/0087987 | A1* | 4/2010 | Huang | B60W 40/08 701/36 |
| 2010/0197359 | A1* | 8/2010 | Harris | H04M 1/66 455/569.1 |
| 2011/0009107 | A1* | 1/2011 | Guba | G08G 1/20 455/418 |
| 2011/0021234 | A1* | 1/2011 | Tibbitts | H04W 48/04 455/517 |
| 2011/0080274 | A1* | 4/2011 | Reed | B60K 28/066 340/425.5 |
| 2011/0183601 | A1* | 7/2011 | Hannon | B60K 35/00 455/1 |
| 2011/0269441 | A1* | 11/2011 | Silver | H04W 4/027 455/418 |
| 2013/0029650 | A1* | 1/2013 | Xiao | H04W 4/027 455/417 |
| 2013/0041521 | A1* | 2/2013 | Basir | B60R 25/33 701/1 |
| 2013/0151111 | A1* | 6/2013 | Skelton | B60R 25/00 701/99 |
| 2013/0157574 | A1 | 6/2013 | Craine | |
| 2013/0169410 | A1* | 7/2013 | Amselem | G05B 1/01 340/5.52 |
| 2014/0142783 | A1* | 5/2014 | Grimm | H04W 4/008 701/2 |
| 2014/0200737 | A1* | 7/2014 | Lortz | B60R 25/25 701/1 |
| 2014/0240089 | A1* | 8/2014 | Chang | G07C 9/00111 340/5.61 |
| 2014/0370870 | A1* | 12/2014 | Mankowski | H04W 4/006 455/418 |
| 2015/0198948 | A1* | 7/2015 | Godley | G05D 1/0011 701/2 |
| 2015/0304483 | A1 | 10/2015 | Dafre' | |
| 2016/0101783 | A1* | 4/2016 | Abou-Nasr | B60W 40/08 340/5.82 |
| 2016/0198310 | A1* | 7/2016 | Chalmers | H04W 4/046 455/456.1 |
| 2017/0034766 | A1* | 2/2017 | Christ | B60K 28/00 |
| 2017/0104865 | A1* | 4/2017 | Skelton | H04M 1/72569 |

* cited by examiner

VEHICLE-BASED MOBILE DEVICE USAGE MONITORING WITH A CELL PHONE USAGE SENSOR

TECHNICAL FIELD

The present disclosure generally relates to mobile device control in a vehicle and, more specifically, vehicle-based mobile device usage monitoring with a cell phone usage sensor.

BACKGROUND

Increasingly, vehicles are equipped with a "Do Not Disturb" feature that limits usage of a mobile device while the vehicle is moving. For example, the feature blocks incoming calls and holds texts messages to be delivered after the vehicle has stopped. Parents use the "Do Not Disturb" feature to limit mobile device usage while their child is driving. However, the "Do Not Disturb" feature can be bypassed by the drivers disabling Bluetooth® connectivity on their phone.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for vehicle-based mobile device usage monitoring with a cell phone usage sensor. An example disclosed vehicle includes a cellphone usage sensor and a communication enforcer. The example cellphone usage sensor monitors a detection area around a driver's seat. The example communication enforcer changes an operation of the vehicle when the cellphone usage sensor detects usage of a mobile device within the detection area, a communication management feature is enabled, and the mobile device is not communicatively coupled to a wireless module of the vehicle.

An example method to monitor mobile device usage in a vehicle includes monitoring a detection area around a driver's seat with a cellphone usage sensor. Additionally, the example method includes, when the cellphone usage sensor detects usage of the mobile device within the detection area, a communication management feature is enabled, and the mobile device is not communicatively coupled to a wireless module of the vehicle, changing an operation of the vehicle.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
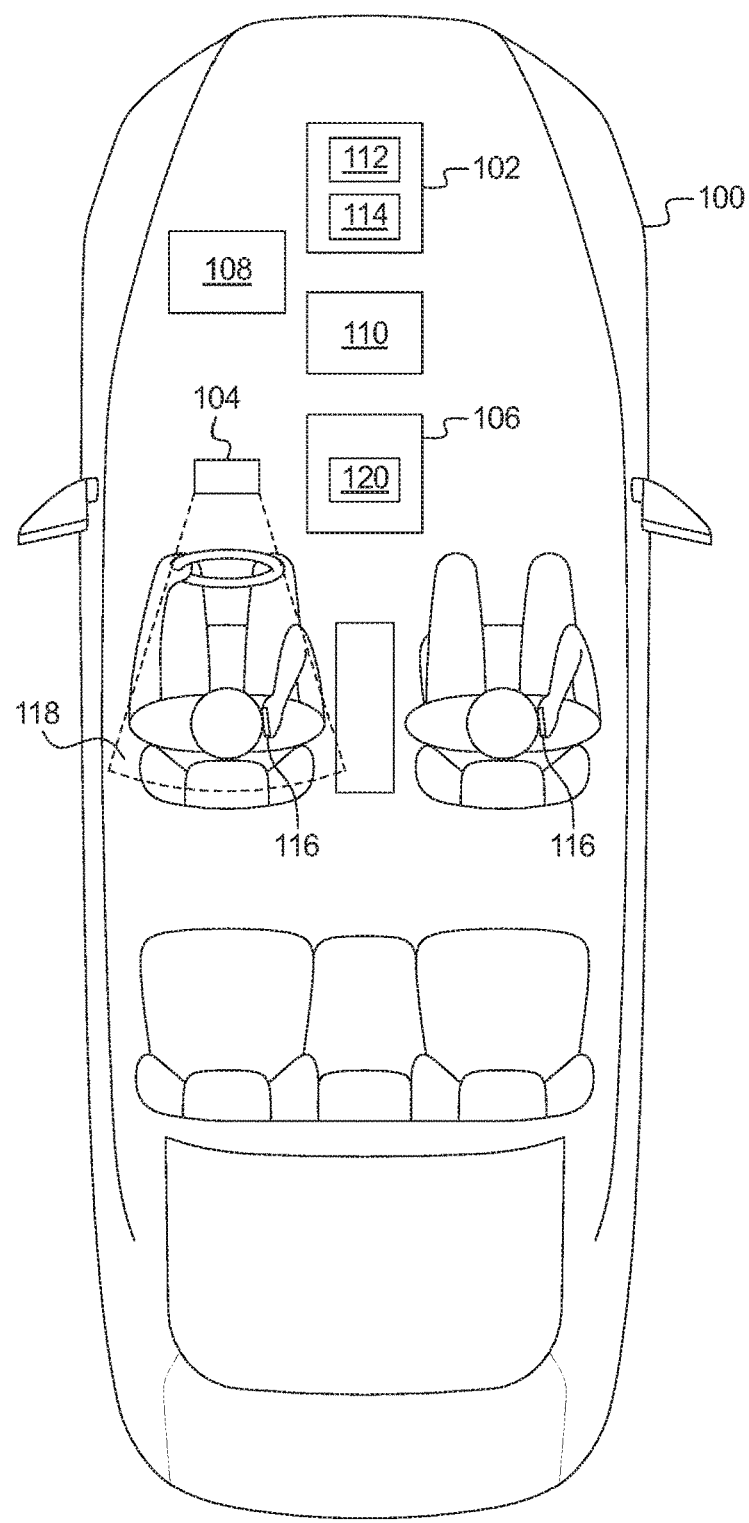
FIG. 1 illustrates a vehicle operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

A vehicle is equipped with a "Do Not Disturb" feature (sometimes referred to as a "communication management feature"). The communication management feature blocks calls and delays delivery of text messages when the vehicle is in motion or when the transmission is not shifted into park. The communication management feature is part of an application executing on an infotainment system (such as SYNC® and MyFord Touch® by Ford®, Entune® by Toyota®, IntelliLink® by GMC®, etc.). The infotainment system connects with a cellular-enabled mobile device (e.g., a phone, a smart watch, a tablet, etc.) with a short range wireless network (e.g., Bluetooth®, Bluetooth Low Energy® (BLE), Near Field Communication (NFC), etc.). Once connected, the communication management feature interacts with an application executing on the mobile device or functions built into the operating system (e.g., Google® Android®, Apple® iOS®, etc.) to block the calls and delay delivery of text messages. In some examples, the communication management feature also directs the mobile device to present a voice mail message and/or a text message response indicating that the user of the mobile device (e.g., the driver) is driving.

The communication management feature may be part of a vehicle security system that configures the operation of vehicle subsystems based on an identity of the driver. In some examples, the identity of the driver is determined based on a unique identifier encoded into a key. Alternatively or additionally, in some examples, the identity of the driver may be determined with biometric sensors (e.g., a finger print scanner, a facial recognition camera, etc.). The vehicle security system is often password protected and is configurable via the infotainment system. Additionally, the vehicle security system is configured to limit some aspects of vehicle performance, such as a maximum speed setting, a sound system usage limit, and/or a sound system volume limit, etc. Additionally, the vehicle security system may be configured so that some features are enabled without the ability for the driver to disable them, such as parking aid, blind spot assistance, and/or cross-traffic alerts, etc.

As disclosed below, the vehicle includes a cell phone usage sensor. The cell phone usage sensor detects when an occupant of the vehicle is using a cellular-enabled mobile device. The cell phone usage sensor has a detection area that may be focused on a particular portion of the cabin of the vehicle. For example, the detection area of the cell phone usage sensor may be focused on the driver's seat of the vehicle. In such a manner, the cell phone usage sensor detects when the driver attempts to use their cellular-enabled mobile device without false positives when the other occupants use their cellular-enabled mobile devices. A communication enforcer monitors (a) the short-range wireless connection between the mobile device and the vehicle, and (b) the cell phone usage sensor monitoring the driver's seat. When (i) the communication management feature is enabled, (ii) the mobile device is not connected to the vehicle via the short-range wireless connection, and (iii) the cell phone usage sensor detects the driver using the mobile device, the communication enforcer reacts to inform one or more contacts of the policy violation and/or take remedial measures until the mobile device is no longer in use. For example, the communication enforcer may send a text message to a contact phone number (e.g., a parent's phone number, etc.) specified during a configuration process and/or may suspend use of the sound system.

FIG. 1 illustrates a vehicle 100 operating in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous or semi-autonomous (e.g., some routine motive functions controlled by the vehicle 100). In the illustrated example the vehicle 100 includes an on-board communications platform 102, one or more cell phone usage sensors 104, an infotainment head unit 106, an engine control unit 108, and a communication enforcer 110.

The on-board communications platform 102 includes wired or wireless network interfaces to enable communication with external networks. The on-board communications platform 102 also includes hardware (e.g., processors, memory, storage, antenna, etc.) and software to control the wired or wireless network interfaces. In the illustrated example, the on-board communications platform 102 includes one or more communication controllers 112 for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11a/b/g/n/ac or others), dedicated short range communication (DSRC), and Wireless Gigabit (IEEE 802.11ad), etc.). In some examples, the on-board communications platform 102 includes a wired or wireless interface (e.g., an auxiliary port, a Universal Serial Bus (USB) port, a Bluetooth® wireless node, etc.) to communicatively couple with a mobile device (e.g., a smart phone, a smart watch, a tablet, etc.). In such examples, the vehicle 100 may communicated with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols. Additionally, in the illustrated example, the on-board communications platform 102 includes a short-range wireless module 114. The short-range wireless module 114 includes the hardware and firmware to establish a connection with a mobile device 116. In some examples, the short-range wireless module 114 implements the Bluetooth and/or Bluetooth Low Energy (BLE) protocols. The Bluetooth and BLE protocols are set forth in Volume 6 of the Bluetooth Specification 4.0 (and subsequent revisions) maintained by the Bluetooth Special Interest Group.

The cell phone usage sensor 104 detects when the mobile device 116 is used within the detection area 118. The detection area 118 is configured to encompass the driver's seat so that usage of the mobile device 116 is detected (e.g., at the head of the driver, in the lap of the driver, etc.). The cell phone usage sensor 104 detects electromagnetic radiation that is broadcast by the mobile device when the mobile device is active communication with a cellular network (e.g., via a phone call, via a text message, via internet data usage, etc.). Examples of the cell phone usage sensor 104 are described in U.S. Pat. No. 9,002,402, entitled "System for Detecting Usage of a Wireless Phone in an Automobile," issued Apr. 7, 2015, which in herein incorporated by reference in its entirety. The cell phone usage sensor 104 may be mounted in any suitable location that provides line of sight to the detection area 118. In some examples, the cell phone usage sensor 104 is mounted on a interior roof-mounted console or a rear view mirror.

The infotainment head unit 106 provides an interface between the vehicle 100 and a user. The infotainment head unit 106 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 106 includes hardware (e.g., a processor or controller, memory, storage, etc.) and software (e.g., an operating system, etc.) for an infotainment system 120 (such as SYNC® and MyFord Touch® by Ford®, Entune® by Toyota®, IntelliLink® by GMC®, etc.). Additionally, the infotainment head unit 106 displays the infotainment system 120 on, for example, the center console display. The infotainment system 120 includes a vehicle security system that facilitates users (e.g., the owners of the vehicle 100) to configure (a) communication preferences (e.g., a phone number, a email address, etc.), (b) limits on subsystems while particular people are driving, and (c) actions to performs when the driver violates the mobile device usage policy. For example, the vehicle security system may be the MyKey® system by Ford.

The engine control unit 108 is an electronic control unit (ECU) that monitors and controls the engine of the vehicle 100. The engine control unit 108 control engine parameters such as air-fuel mixture, ignition timing, and idle speed, etc. The engine control unit 108 receives information from speed sensors (not shown) and the vehicle security system to determine a current speed of the vehicle and a maximum speed of the vehicle set by the vehicle security system. The engine control unit 108 manipulates the engine parameters (e.g., the air-fuel mixture, etc.) to limit the speed of the vehicle 100 to the maximum speed set by the vehicle security system.

The communication enforcer 110 determines whether the driver is adhering to the mobile device policy set by the vehicle security system. The communication enforcer 110 is communicatively coupled to the cell phone usage sensor 104 and the short-range wireless module 114. The communication enforcer 110 monitors (a) the short-range wireless connection between the mobile device 116 and the short-range wireless module 114, and (b) the cell phone usage sensor 104 monitoring the detection area 118. When (i) the communication management feature is enabled, (ii) the mobile device 116 is not connected to the vehicle 100 via the short-range wireless module 114, and (iii) the cell phone usage sensor 104 detects the driver using the mobile device 116, the communication enforcer 110 performs actions specified by the vehicle security system. In some examples, the communication enforcer 110, via the communication controller 112, notifies the owner of the vehicle 100 as specified by the vehicle security system. For example, the communication enforcer 110 may send a text notification or an email notification. Additionally, in some examples, the communication enforcer 110 takes actions that affect the vehicle 100. In some such examples, the communication enforcer 110 limits the maximum speed of the vehicle 100, displays a warning on the dashboard display and/or the center console display, reduces the engine power, gradually powers the vehicle 100 down in stages, provides a voice warning, creates a report, vibrates a seat, turns off the HVAC system, mutes the sound system (e.g., while the driver is using the mobile device 116 and/or for a period after the user uses the mobile device 116, etc.), repeatedly actuates a chime, and/or sends a text to driver's phone (e.g., telling them that a message has been sent to their parent(s)), etc.

Figure 2:
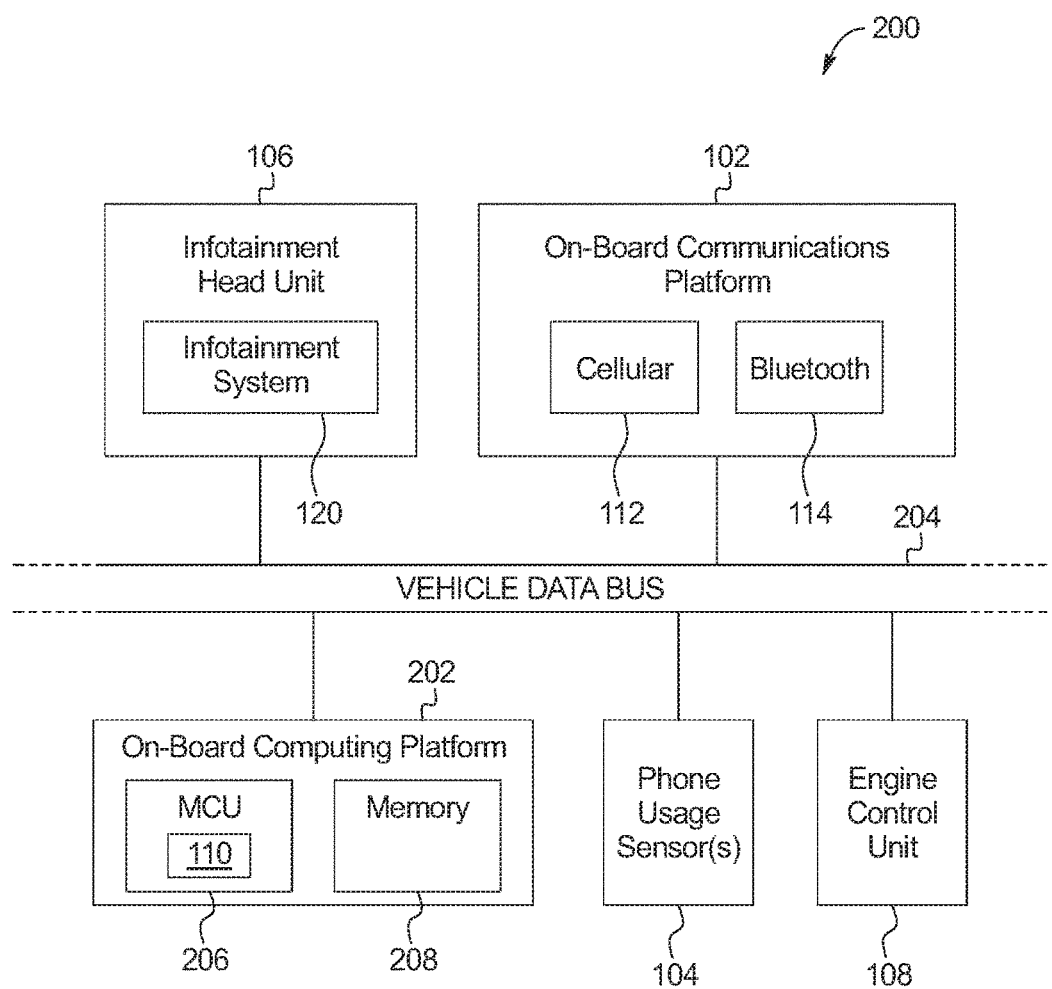
FIG. 2 is a block diagram of electronic components of the vehicle of FIG. 1.

FIG. 2 is a block diagram of electronic components 200 of the vehicle 100 of FIG. 1. In the illustrated example, the electronic components 200 includes the on-board communications platform 102, the cell phone usage sensor 104, the infotainment head unit 106, the engine control unit 108, the on-board computing platform 202, and the vehicle data bus 204.

The on-board computing platform 202 includes a processor or controller 206 and memory 208. In some examples, the on-board computing platform 202 is structured to include the communication enforcer 110. Alternatively, in some examples, the communication enforcer 110 may be incorporated into another electronic control unit (ECU) with its own processor 206 and memory 208. The processor or controller 206 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 208 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 208 includes multiple kinds of memory, particularly volatile memory and non-volatile memory.

The memory 208 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 208, the computer readable medium, and/or within the processor 206 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The vehicle data bus 204 communicatively couples the on-board communications platform 102, the cell phone usage sensor 104, the infotainment head unit 106, the engine control unit 108, and the on-board computing platform 202. In some examples, the vehicle data bus 204 includes one or more data buses. The vehicle data bus 204 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
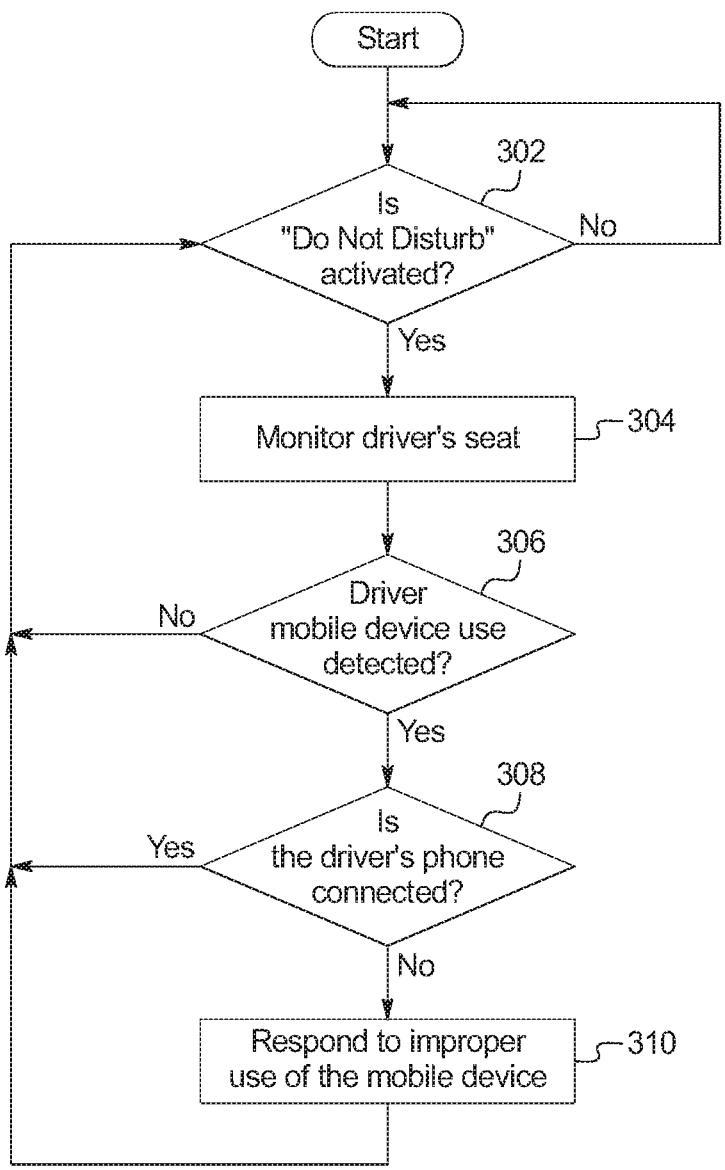
FIG. 3 is a flow diagram of a method to monitor a mobile device with a cell phone usage sensor that may be implemented by the electronic components of FIG. 2.

FIG. 3 is a flow diagram of a method to monitor a mobile device 116 with a cell phone usage sensor 104 that may be implemented by the electronic components 200 of FIG. 2. Initially, at block 302, the communication enforcer 110 determines whether the "Do Not Disturb" feature is activated. For example, the "Do Not Disturb" feature may be activated with the vehicle security system recognizes (e.g., via the key in the ignition, via facial recognition, etc.) that the driver is a person on a "Do Not Disturb" feature profile list. If the "Do Not Disturb" feature is activated, the method continues at block 304. Otherwise, if the "Do Not Disturb" feature is not activated, the method waits until it is activated. At block 304, the communication enforcer 110 monitors the detection area 118 via the cell phone usage sensor 104.

At block 306, the communication enforcer 110 determines whether the driver is using the mobile device 116. If the driver is using the mobile device 116, the method continues at block 308. Otherwise, if the driver is not using the mobile device 116, the method returns to block 302. At block 308, the communication enforcer 110 determines whether the mobile device 116 is wirelessly connected to the short-range wireless module 114. If the mobile device 116 is wirelessly connected to the short-range wireless module 114, the method returns to block 302. Otherwise, if the mobile device 116 is not wirelessly connected to the short-range wireless module 114, the method continues at block 310. At block 310, the communication enforcer 110 responds to the improper use of the mobile device 116. The communication enforcer 110 notifies the owner of the vehicle 100 (e.g., via a text message, via an email, etc.) and/or alters the operation of the vehicle 100. In some such examples, the communication enforcer 110 limits the maximum speed of the vehicle 100, displays a warning on the dashboard display and/or the center console display, reduces the engine power, gradually powers the vehicle 100 down in stages, provides a voice warning, creates a report, vibrates a seat, turns off the HVAC system, mutes the sound system (e.g., while the driver is using the mobile device 116 and/or for a period after the user uses the mobile device 116, etc.), repeatedly actuates a chime, and/or sends a text to driver's phone (e.g., telling them that a message has been sent to their parent(s)), etc.

The flowchart of FIG. 3 is representative of machine readable instructions stored in memory (such as the memory 208 of FIG. 2) that comprise one or more programs that, when executed by a processor (such as the processor 206 of FIG. 2), cause the vehicle 100 to implement the example communication enforcer 110 of FIGS. 1 and 2. Further, although the example program(s) is/are described with reference to the flowchart illustrated in FIG. 3, many other methods of implementing the example communication enforcer 110 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a cellphone usage sensor to monitor an area around a driver's seat; and
a communication enforcer to,
responsive to the cellphone usage sensor detecting usage of a mobile device within the area:
change an operation of the vehicle;
send a message to a different mobile device; and
transmit a notification to the mobile device indicating that the message has been transmitted to the different mobile device.

2. The vehicle of claim 1, wherein to change the operation of the vehicle, the communication enforcer is to limit a maximum speed of the vehicle.

3. The vehicle of claim 1, wherein to change the operation of the vehicle, the communication enforcer is to display a warning on a dashboard display and a center console display.

4. The vehicle of claim 1, wherein to change the operation of the vehicle, the communication enforcer is to reduce an engine power of the vehicle.

5. The vehicle of claim 1, wherein to change the operation of the vehicle, the communication enforcer is to vibrate the driver's seat.

6. The vehicle of claim 1, wherein to change the operation of the vehicle, the communication enforcer is to deactivate a heating ventilation and air conditioning system.

7. The vehicle of claim 1, wherein to change the operation of the vehicle, the communication enforcer is to mute a sound system for a period of time after detecting the usage of the mobile device.

8. The vehicle of claim 1, wherein to change the operation of the vehicle, the communication enforcer is to repeatedly actuate a chime.

9. The vehicle of claim 1, wherein the communication enforcer is to, based on an identity of a driver, prevent disabling of a subsystem by the driver.

10. The vehicle of claim 1, wherein the communication enforcer is to:
determine an identity of a driver by comparing features of the driver against a profile list; and
based on the identity of the driver, automatically enable a communication management feature.

11. The vehicle of claim 10, wherein the communication enforcer is to, responsive to the features of the driver being identified in the profile list, automatically block calls received via the mobile device and automatically delay text messages received via the mobile device.

12. The vehicle of claim 10, wherein the communication enforcer is to, responsive to the features of the driver being identified in the profile list and responsive to the vehicle being in motion, automatically block calls received via the mobile device and automatically delay text messages received via the mobile device.

13. The vehicle of claim 10, wherein the communication enforcer is to, responsive to the features of the driver being identified in the profile list and responsive to a transmission of the vehicle not being a position for parking the vehicle, automatically block calls received via the mobile device and automatically delay text messages received via the mobile device.

14. The vehicle of claim 1, wherein the message is indicative of the driver's usage of the mobile device within the driver's seat.

15. The vehicle of claim 1, wherein the different mobile device is that of an owner of the vehicle.

16. A method to monitor mobile device usage in a vehicle comprising:
monitoring a detection area around a driver's seat with a cellphone usage sensor; and
responsive to the cellphone usage sensor detecting usage of a mobile device within the detection area: changing an operation of the vehicle; and
sending a message to a different mobile device; and
transmit a notification to the mobile device indicating that the message has been transmitted to the different mobile device.

17. The method of claim 16, wherein changing the operation of the vehicle includes limiting a maximum speed of the vehicle.

18. The method of claim 16, wherein changing the operation of the vehicle includes displaying a warning on a dashboard display and a center console display.

19. The method of claim 16, wherein changing the operation of the vehicle includes reducing an engine power of the vehicle.

20. The method of claim 16, wherein changing the operation of the vehicle includes vibrating the driver's seat.

21. The method of claim 16, wherein changing the operation of the vehicle includes deactivating a heating ventilation and air conditioning system.

22. The method of claim 16, wherein changing the operation of the vehicle includes muting a sound system for a period of time after detecting the usage of the mobile device.

23. The method of claim 16, wherein changing the operation of the vehicle includes repeatedly actuating a chime.

* * * * *